US007194445B2

(12) United States Patent
Chan et al.

(10) Patent No.: US 7,194,445 B2
(45) Date of Patent: Mar. 20, 2007

(54) ADAPTIVE PROBLEM DETERMINATION AND RECOVERY IN A COMPUTER SYSTEM

(75) Inventors: Hoi Yeung Chan, Stamford, CT (US); Rajarshi Das, New Rochelle, NY (US); Jeffrey Owen Kephart, Cortlandt Manor, NY (US); Alla Segal, Mount Kisco, NY (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 681 days.

(21) Appl. No.: 10/252,979

(22) Filed: Sep. 20, 2002

(65) Prior Publication Data

US 2004/0059966 A1    Mar. 25, 2004

(51) Int. Cl.
  G06E 1/00    (2006.01)
  G06E 3/00    (2006.01)
  G06F 15/18   (2006.01)
  G06G 7/00    (2006.01)

(52) U.S. Cl. .......................................... 706/20; 706/47
(58) Field of Classification Search .................... 706/1, 706/15, 45, 13, 14, 20, 47; 700/1, 90, 26; 709/219, 223; 395/76
See application file for complete search history.

(56) References Cited

U.S. PATENT DOCUMENTS

| 5,638,494 A | 6/1997 | Pinard et al. |
| 5,701,400 A * | 12/1997 | Amado ........................ 706/45 |
| 5,790,789 A | 8/1998 | Suarez |
| 5,805,776 A | 9/1998 | Juengst et al. ................. 395/75 |
| 5,832,467 A * | 11/1998 | Wavish ........................ 706/13 |
| 5,909,544 A | 6/1999 | Anderson, II et al. .. 395/200.38 |
| 5,935,264 A | 8/1999 | Nevill et al. ................ 714/724 |
| 5,978,911 A | 11/1999 | Knox et al. .................... 713/1 |
| 6,023,586 A | 2/2000 | Gaisford et al. ............ 395/712 |
| 6,026,374 A | 2/2000 | Chess .......................... 705/26 |

(Continued)

FOREIGN PATENT DOCUMENTS

WO    WO 02/093290    11/2002

OTHER PUBLICATIONS http://www.ibm.com/research/autonomic, "Autonomic Computing: IBM's Perspective on the State of Information Technology", Oct. 2001, pp. 1-40.

(Continued)

*Primary Examiner*—David Vincent
*Assistant Examiner*—Peter Coughlan
(74) *Attorney, Agent, or Firm*—Duke W. Yee; Wayne P. Bailey

(57) ABSTRACT

A method, computer program product, and data processing system for recognizing, tracing, diagnosing, and repairing problems in an autonomic computing system is disclosed. Rules and courses of actions to follow in logging data, in diagnosing faults (or threats of faults), and in treating faults (or threats of faults) are formulated using an adaptive inference and action system. The adaptive inference and action system includes techniques for conflict resolution that generate, prioritize, modify, and remove rules based on environment-specific information, accumulated time-sensitive data, actions taken, and the effectiveness of those actions. Thus, the present invention enables a dynamic, autonomic computing system to formulate its own strategy for self-administration, even in the face of changes in the configuration of the system.

63 Claims, 4 Drawing Sheets

U.S. PATENT DOCUMENTS

| | | | |
|---|---|---|---|
| 6,055,562 A | 4/2000 | Devarakonda et al. | |
| 6,125,359 A | 9/2000 | Lautzenheiser et al. | 706/60 |
| 6,182,245 B1 | 1/2001 | Akin et al. | 714/38 |
| 6,199,204 B1 | 3/2001 | Donohue | 717/11 |
| 6,219,829 B1 | 4/2001 | Sivakumar et al. | 717/4 |
| 6,256,771 B1 | 7/2001 | O'Neil et al. | 717/1 |
| 6,286,131 B1 | 9/2001 | Beers et al. | 717/4 |
| 6,330,596 B1 | 12/2001 | Yates et al. | 709/201 |
| 6,353,897 B1 | 3/2002 | Nock et al. | 714/38 |
| 6,360,331 B2 | 3/2002 | Vert et al. | 714/4 |
| 6,463,584 B1 | 10/2002 | Gard et al. | 717/171 |
| 6,467,088 B1 | 10/2002 | AlSafadi et al. | 717/713 |
| 6,473,794 B1 | 10/2002 | Guheen | 709/224 |
| 6,529,950 B1 | 3/2003 | Lumeslky et al. | 709/218 |
| 6,567,957 B1 | 5/2003 | Chang et al. | 716/4 |
| 6,584,455 B1 | 6/2003 | Hekmatpour | 706/45 |
| 6,751,608 B1 | 6/2004 | Cohen et al. | 707/3 |
| 6,779,016 B1 | 8/2004 | Aziz et al. | 709/201 |
| 6,804,709 B2 | 10/2004 | Manjure et al. | 709/220 |
| 6,834,341 B1 | 12/2004 | Bahl et al. | 713/156 |
| 6,851,115 B1 | 2/2005 | Cheyer et al. | |
| 6,892,218 B2 | 5/2005 | Heddaya et al. | |
| 6,970,869 B1 | 11/2005 | Slaughter et al. | |
| 2002/0100036 A1 | 7/2002 | Moshir et al. | 717/173 |
| 2002/0120685 A1 | 8/2002 | Srivastava et al. | 709/203 |
| 2002/0143819 A1 | 10/2002 | Han et al. | 707/513 |
| 2002/0174414 A1 | 11/2002 | Matsuo et al. | 717/126 |
| 2002/0183866 A1* | 12/2002 | Dean et al. | 700/26 |
| 2003/0154279 A1 | 8/2003 | Aziz | 709/225 |
| 2003/0200293 A1* | 10/2003 | Fearn et al. | 709/223 |
| 2003/0212924 A1 | 11/2003 | Avvari et al. | 714/38 |
| 2003/0235158 A1 | 12/2003 | Lee et al. | 370/256 |
| 2004/0236843 A1* | 11/2004 | Wing et al. | 709/219 |

OTHER PUBLICATIONS

Bagchi et al., "Dependency Analysis in Distributed Systems using Fault Injection: Application to Problem Determination in an e-commerce Environment", Distributed Operations and Management, 2001, 11 pages.

Brown et al., "An Active Approach to Characterizing Dynamic Dependencies for Problem Determination in a Distributed Environment", Seventh IFIP/IEEE International Symposium on Integrated Network Management, 2001, 14 pages.

Butler et al., "Error Burst Metrics for Failure Trajectory Analysis", International Transmission System, IEE Colloquium, The Institution of Electrical Engineers, 1994, IEE, Savoy Place, London WC2R 0BL, UK, 4 pages.

Goswami et al., "Prediction-Based Dynamic Load-Sharing Heuristics", IEEE Transactions on Parallel and Distributed Systems, vol. 4, No. 6, Jun. 1993, pp. 638-648.

Hellerstein, "An Approach to Selecting Metrics for Detecting Performance Problems in Information Systems", Proceedings of the Second International Conference on Systems Management, Jun. 19-21, 1996, Toronto, Canada, pp. 1-11.

Hellerstein et al., "Mining Event Data for Actionable Patterns", IBM Thomas J. Watson Research Center, Hawthorne, New York, The Computer Management Group, 2000, 12 pages.

Keller et al., "Classification and Computation of Dependencies for Distributed Management", Proceedings of the Fifth IEEE Symposium on Computers and Communication, 2000, pp. 78-83.

Muggleton et al., "Efficient Induction of Logic Programs", The Turing Institute, Glasgo, UK, pp. 1-14.

Quinlan et al., "Induction of Logic Programs: FOIL and Related Systems", New Generation Computing 13, 1995, pp. 287-312, 28 pages.

Lee et al., "Error/Failure Analysis Using Event Logs from Fault Tolerant Systems", Fault-Tolerant Computing, 1991, FTCS-21. Digest of Papers., Twenty-First International Symposium, 1991, pp. 10-17.

Ma et al., "Event Browser: A Flexible Tool for Scalable Analysis of Event Data", Distributed Operations and Management, 1999, pp. 1-12.

Ma et al., "Mining Mutually Dependent Patterns", IEEE Conference on Data Mining, 2001, pp. 1-20.

Tang et al., "Analysis and Modeling of Correlated Failures in Multicomputer Systems", IEEE Transactions on Computers, vol. 41, No. 5, May 1992, pp. 567-577.

Thottan et al., "Proactive Anomaly Detection Using Distributed Intelligent Agents", IEEE Network, Sep./Oct. 1998, pp. 21-27.

Vilalta et al., "Predictive Algorithms in the Management of Computer Systems", IBM Systems Journal, vol. 41, No. 3, 2002, pp. 461-474.

Rouvellou et al., "Combining Different Business Rules Technologies: A Rationalization", Proc. Of the OOPSLA 2000 Workshop on Best-Practices in Business Rule Design and Implementation, Minneapolis, MN, Oct. 2000, pp. 1-6.

Grosof, IBM Reserach Report RC20836, "Courteous Logic Programs: Prioritized Conflict Handling for Rules", May 97, 63pp.

Van Den Heuvel W-J et al: "Service Representation, Discovery, and Composition for E-marketplaces", Cooperative Information Systems. 9th International Conference Coopis 2001. Proceedings (Lecture Notes in Computer Science vol. 2172), Proceedings, Trento, Italy, Sep. 5-7, 2000, pp. 270-284.

Piccinelli et al., "Dynaimc Service Aggregation in Elecronic Marketplaces", Computer Networks 37 (2001), Elsevier Science Publishers B.V., Amsterdam, NL, vol. 37, No. 2, Oct. 2001, pp. 95-109.

Guttman, "Service Location Protocol: Automatic Discovery of IP Network Services", IEEE Internet Computing, IEEE Service Center, Piscataway, NJ, US, vol. 3, No. 4, Jul. 1, 1999, pp. 71-80.

Feng et al., "Updating Semantic Information to Support Coordination in Distributed Software Development Environments", p. 13-22, 1993 IEEE, retreived from IEEE database Mar. 4, 2004.

Gavrilovska et al., "A Practical Approach for 'Zero' Downtime in an Operational Information System", Jul. 2002, retrieved from IEEE database Mar. 4, 2004.

Panagos et al., "Synchronization and Recovery in a Client-Server Storage System", p. 209-223, 1997 The VLDB Journal, retrieved from ACM Portal Database Mar. 4, 2004.

Yajnik et al., "STL: A Tool for On-Line Software Update and Rejuvenation", p. 258, 1997 IEEE, retrieved from IEEE database Mar. 4, 2004.

IBM Technical Disclosure Bulletin, Mar. 2002, No. 455, p. 499, "Distributed UDDI (Universal Description Discovery and Integration) Registry Lookup and Storage".

Stevens, "18.2 Connection Establishment and Termination", TCP/IP Illustrated, vol. 1: The Protocols, Addison-Wesley, 1994, pp. 15-16, 229-234.

Newton's Telecom Dictionary, "Denial of Service Attack", Feb. 2002, CMP Books, 18th Edition, p. 214.

IEEE 100 The Authoritative Dictionary of IEEE Standards Terms, "failover", Dec. 2000, Standards Information Network IEEE Press, Seventh Edition, p.413.

Addis et al., "Negotiating for Software Services", 2000, IEEE, pp. 1039-1043.

Faratin et al., "Using Similarity Criteria to Make Negotiation Trade-Offs", 2000, IEEE, pp. 1-8.

Faratin, "Automated Service Negotiation Between Autonomous Computational Agents", Dec. 2000, University of London, Department of Electronic Engineering, Queen Mary & Westfield College, pp. 1-255.http://ccs.mit.edu/peyman/pubs/peyman-thesis.pdf.

* cited by examiner

ADAPTIVE PROBLEM DETERMINATION AND RECOVERY IN A COMPUTER SYSTEM

CROSS REFERENCE TO RELATED APPLICATIONS

The present invention is related to the following applications entitled: "Method and Apparatus for Publishing and Monitoring Entities Providing Services in a Distributed Data Processing System", Ser. No. 10/252,816; "Method and Apparatus for Automatic Updating and Testing of Software", Ser. No. 10/252,868; "Composition Service for Autonomic Computing", Ser. No. 10/252,324; and "Self-Configuring Computing System", Ser. No. 10/252,247; all filed even date hereof, assigned to the same assignee, and incorporated herein by reference.

BACKGROUND OF THE INVENTION

1. Technical Field

The present invention relates generally to an improved data processing system, and in particular, to a method and apparatus for managing hardware and software components. Still more particularly, the present invention provides a method and apparatus for automatically recognizing, tracing, diagnosing, and recovering from problems in hardware and software components to achieve functionality requirements.

2. Description of Related Art

Modern computing technology has resulted in immensely complicated and ever-changing environments. One such environment is the Internet, which is also referred to as an "internetwork." The Internet is a set of computer networks, possibly dissimilar, joined together by means of gateways that handle data transfer and the conversion of messages from a protocol of the sending network to a protocol used by the receiving network. When capitalized, the term "Internet" refers to the collection of networks and gateways that use the TCP/IP suite of protocols. Currently, the most commonly employed method of transferring data over the Internet is to employ the World Wide Web environment, also called simply "the Web". Other Internet resources exist for transferring information, such as File Transfer Protocol (FTP) and Gopher, but have not achieved the popularity of the Web. In the Web environment, servers and clients effect data transaction using the Hypertext Transfer Protocol (HTTP), a known protocol for handling the transfer of various data files (e.g., text, still graphic images, audio, motion video, etc.). The information in various data files is formatted for presentation to a user by a standard page description language, the Hypertext Markup Language (HTML). The Internet also is widely used to transfer applications to users using browsers. Often times, users of may search for and obtain software packages through the Internet. While computer technology has become more powerful, it has also become more complex. As the complexity and heterogeneity of computer systems continues to increase, it is becoming increasingly difficult to diagnose and correct hardware and software problems. As computing systems become more autonomic (i.e., self-regulating), this challenge will become even greater for several reasons. First, autonomic computing systems, being self-configuring, will tend to work around such problems, making it difficult to recognize that anything is wrong. Second, problems will become harder to trace to their source because of the more ephemeral relationships among elements in the autonomic system. In other words, the set of elements that participated in the failure may no longer be connected to one another by the time the problem is noticed, making reconstruction of the problem very difficult. For instance, a number of publications address the topic of problem identification, but do so in a statically-configured system, such as Tang, D.; Iyer, R. K., "Analysis and modeling of correlated failures in multicomputer systems," *IEEE Transactions on Computers*, Vol. 41 Issue 5, May 1992, pp. 567–577; Lee, I.; Iyer, R. K.; Tang, D., "Error/failure analysis using event logs from fault tolerant systems," *Digest of Papers., Twenty-First International Symposium on Fault-Tolerant Computing* (FTCS-21), 1991, pp. 10–17; and Thottan, M.; Chuanyi Ji, "Proactive anomaly detection using distributed intelligent agents," *IEEE Network*, Vol. 12 Issue 5, September–October 1998, pp. 21–27.

Today, human technical support personnel or system administrators perform most of the tasks associated with recognizing, diagnosing, and repairing hardware or software problems manually, often employing a good deal of trial and error, and relying on their own memory or ability to recognize similar patterns of behavior. This is a laborious process, and as system complexity increases there are progressively fewer system administrators who can do it competently. Thus, a need exists for technology to automate the recognition, tracing, diagnosis, and repair of problems in autonomic systems.

SUMMARY OF THE INVENTION

The present invention is directed toward a method, computer program product, and data processing system for recognizing, tracing, diagnosing, and repairing problems in an autonomic computing system. Rules and courses of actions to follow in logging data, in diagnosing faults (or threats of faults), and in treating faults (or threats of faults) are formulated using an adaptive inference and action system. The adaptive inference and action system includes techniques for conflict resolution that generate, prioritize, modify, and remove rules based on environment-specific information, accumulated time-sensitive data, actions taken, and the effectiveness of those actions. Thus, the present invention enables a dynamic, autonomic computing system to formulate its own strategy for self-administration, even in the face of changes in the configuration of the system.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
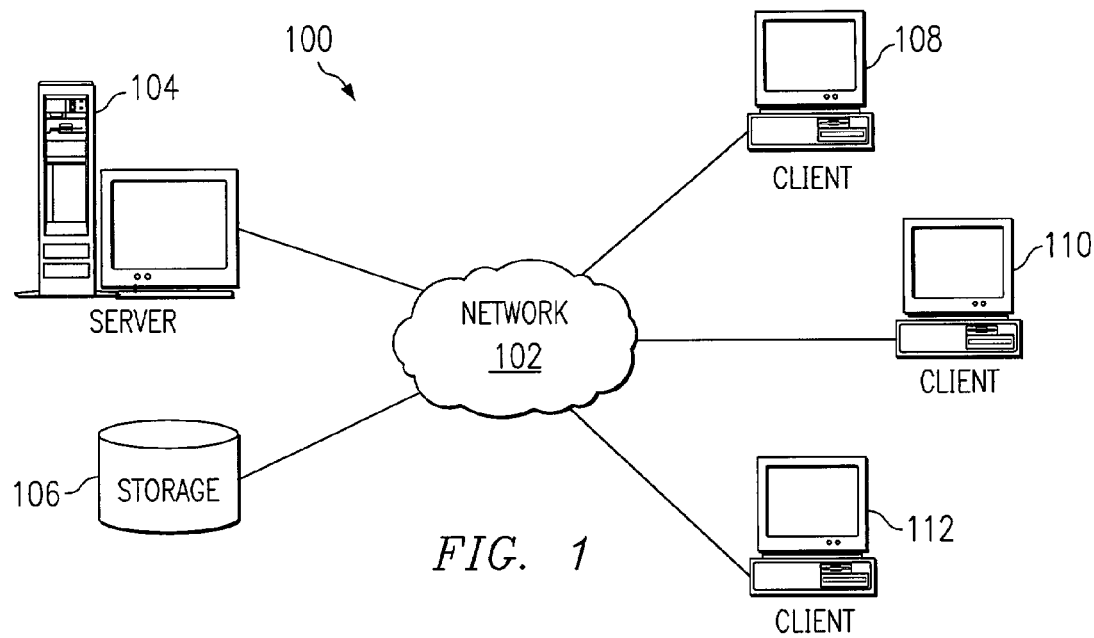
FIG. 1 is a diagram of a networked data processing system in which the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108–112. Clients 108, 110, and 112 are clients to server 104. Network data processing system 100 may include additional servers, clients, and other devices not shown. In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
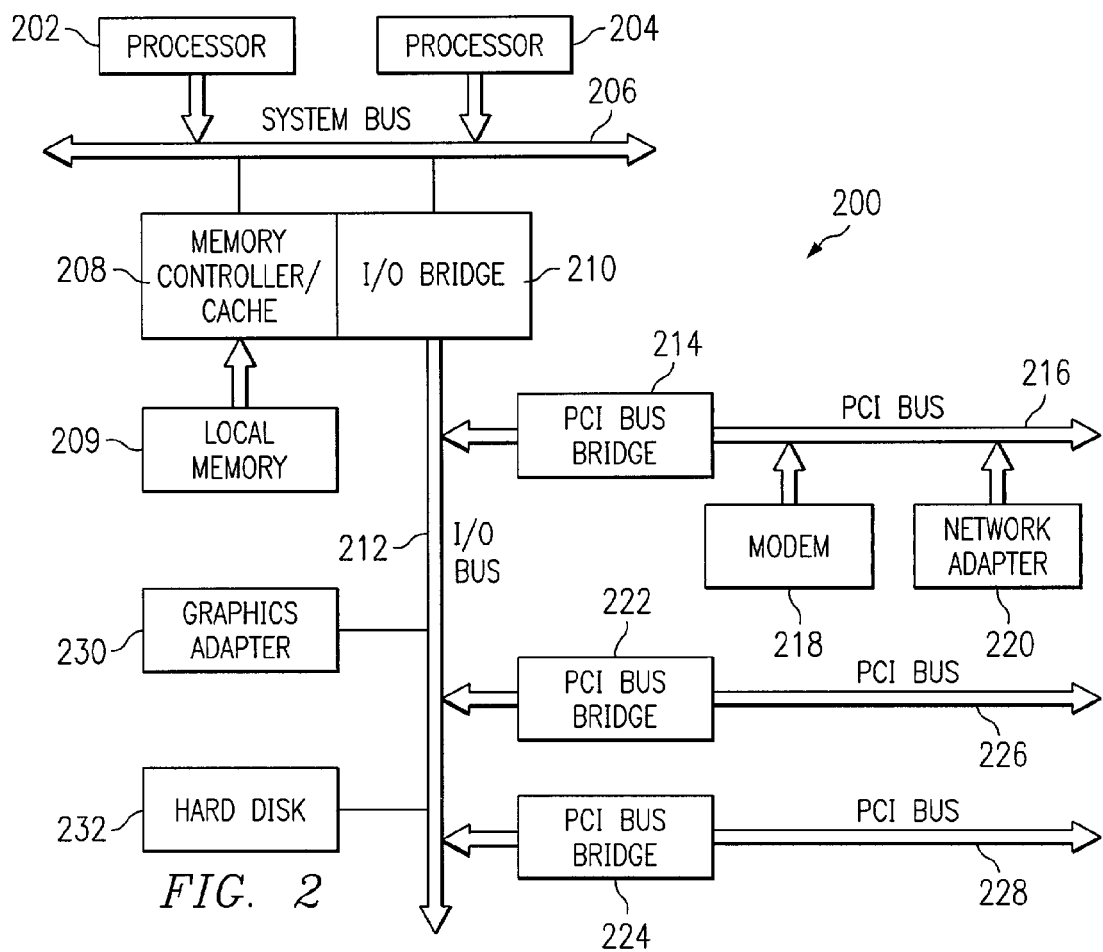
FIG. 2 is a block diagram of a server system within the networked data processing system of FIG. 1.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108–112 in FIG. 1 may be provided through modem 218 and network adapter 220 connected to PCI local bus 216 through add-in boards.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM eServer pSeries system, a product of International Business Machines Corporation in Armonk, N.Y., running the Advanced Interactive Executive (AIX) operating system or LINUX operating system.

Figure 3:
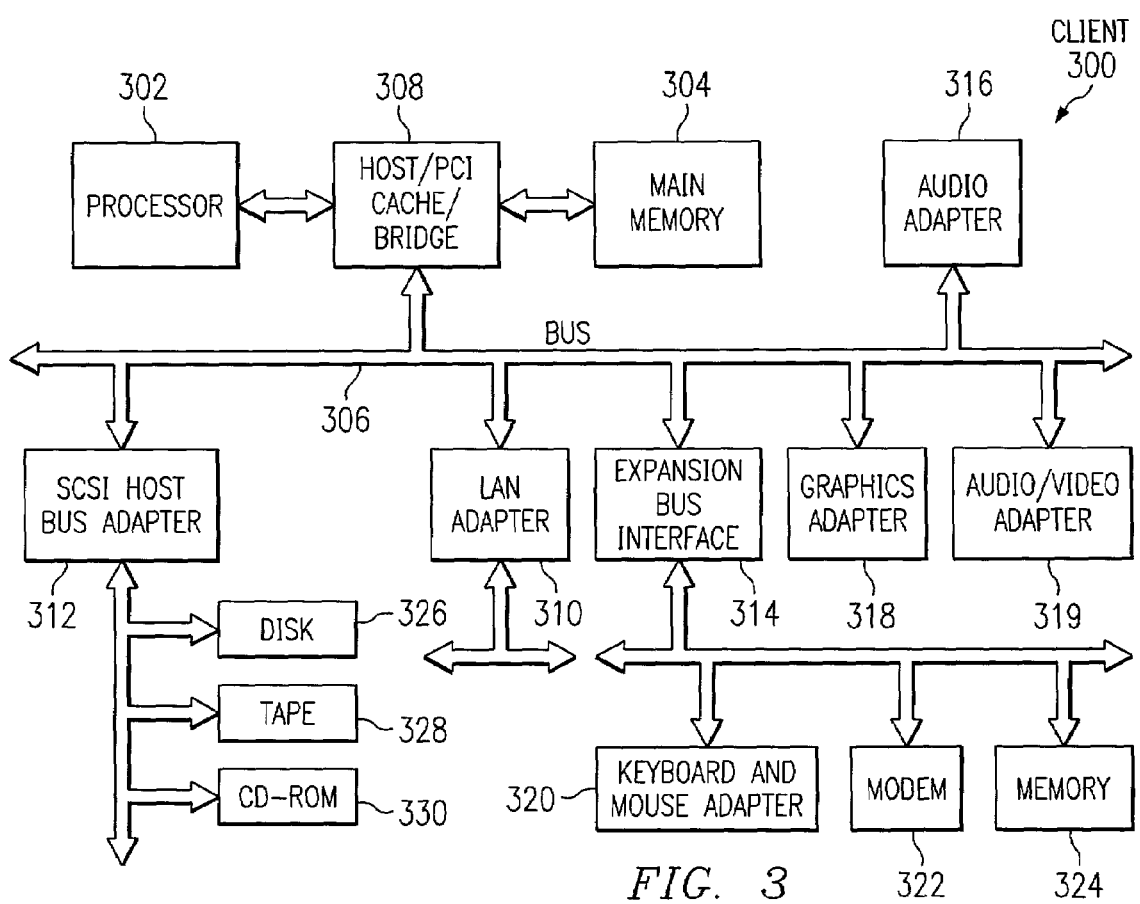
FIG. 3 is a block diagram of a client system within the networked data processing system of FIG. 1.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows XP, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash read-only memory (ROM), equivalent nonvolatile memory, or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interfaces. As a further example, data processing system 300 may be a personal digital assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

Figure 4:
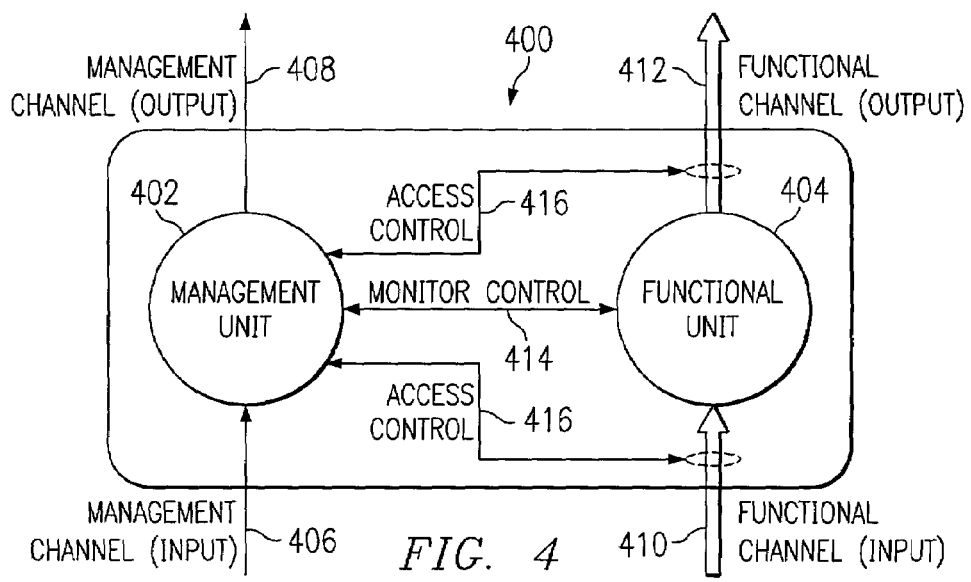
FIG. 4 is a diagram of an autonomic element in accordance with a preferred embodiment of the present invention.

The present invention is directed to a method and apparatus for problem determination and correction in a self-managing, autonomic computing system. The hardware and software components making up such a computing system (e.g., databases, storage systems, Web servers, file servers, and the like) are self-managing components called "autonomic elements." Autonomic elements couple conventional computing functionality (e.g., a database) with additional self-management capabilities. FIG. 4 is a diagram of an autonomic element in accordance with a preferred embodiment of the present invention. According to the preferred embodiment depicted in FIG. 4, an autonomic element 400 comprised a management unit 402 and a functional unit 404. One of ordinary skill in the art will recognize that an autonomic element need not be clearly divided into separate units as in FIG. 4, as the division between management and functional units is merely conceptual.

Management unit 402 handles the self-configuration features of autonomic element 400. In particular, management unit 402 is responsible for adjusting and maintaining functional unit 404 pursuant to a set of goals for autonomic element 400, as indicated by monitor/control interface 414. Management unit 402 is also responsible for limiting access to functional unit 404 to those other system components (e.g., other autonomic elements) that have permission to use functional unit 404, as indicated by access control interfaces 416. Management unit 402 is also responsible for establishing and maintaining relationships with other autonomic elements (e.g., via input channel 406 and output channel 408).

Functional unit 404 consumes services provided by other system components (e.g., via input channel 410) and provides services to other system components (e.g., via output channel 412), depending on the intended functionality of autonomic element 400. For example, an autonomic database element provides database services and an autonomic storage element provides storage services. It should be noted that an autonomic element, such as autonomic element 400, may be a software component, a hardware component, or some combination of the two. One goal of autonomic computing is to provide computing services at a functional level of abstraction, without making rigid distinctions between the underlying implementations of a given functionality.

Figure 5:
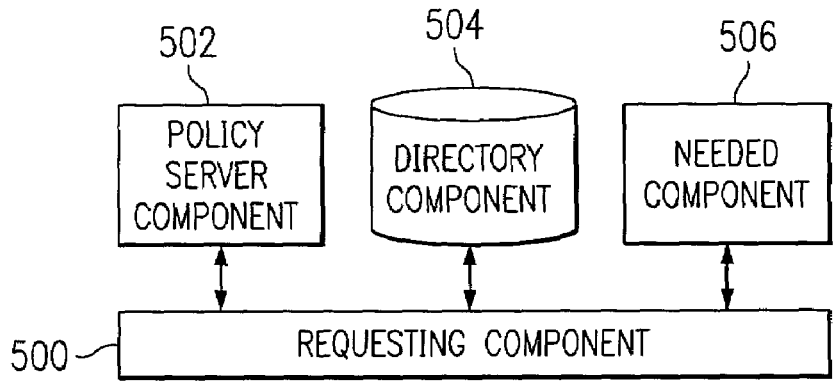
FIG. 5 is a diagram a mechanism for establishing service-providing relationships between autonomic elements in accordance with a preferred embodiment of the present invention.

Autonomic elements operate by providing services to other components (which may themselves be autonomic elements) and/or obtaining services from other components. In order for autonomic elements to cooperate in such a fashion, one requires a mechanism by which an autonomic element may locate and enter into relationships with additional components providing needed functionality. FIG. 5 is a diagram depicting such a mechanism constructed in accordance with a preferred embodiment of the present invention.

A "requesting component" 500, an autonomic element, requires services of another component in order to accomplish its function. In a preferred embodiment, such function may be defined in terms of a policy of rules and goals. Policy server component 502 is an autonomic element that establishes policies for other autonomic elements in the computing system. In FIG. 5, policy server component 502 establishes a policy of rules and goals for requesting component 500 to follow and communicates this policy to requesting component 500. In the context of network communications, for example, a required standard of cryptographic protection may be a rule contained in a policy, while a desired quality of service (QoS) may be a goal of a policy.

In furtherance of requesting component 500's specified policy, requesting component 500 requires a service from an additional component (for example, encryption of data). In order to acquire such a service, requesting component 500 consults directory component 504, another autonomic element. Directory component 504 is preferably a type of database that maps functional requirements into components provided the required functionality.

In a preferred embodiment, directory component 504 may provide directory services through the use of standardized directory service schemes such as Web Services Description Language (WSDL) and systems such as Universal Description, Discovery, and Integration (UDDI), which allow a program to locate entities that offer particular services and to automatically determine how to communicate and conduct transactions with those services. WSDL is a proposed standard being considered by the World-Wide Web Consortium, authored by representatives of companies, such as International Business Machines Corporation, Ariba, Inc., and Microsoft Corporation. UDDI version 3 is the current specification being used for Web service applications and services. Future development and changes to UDDI will be handled by the Organization for the Advancement of Structured Information Standards (OASIS).

Directory component 504 provides requesting component 500 information to allow requesting component 500 to make use of the services of a needed component 506. Such information may include an address (such as a network address) to allow an existing component to be communicated with, downloadable code or the address to downloadable code to allow a software component to be provisioned, or any other suitable information to allow requesting component 500 to make use of the services of needed component 506.

Figure 6:
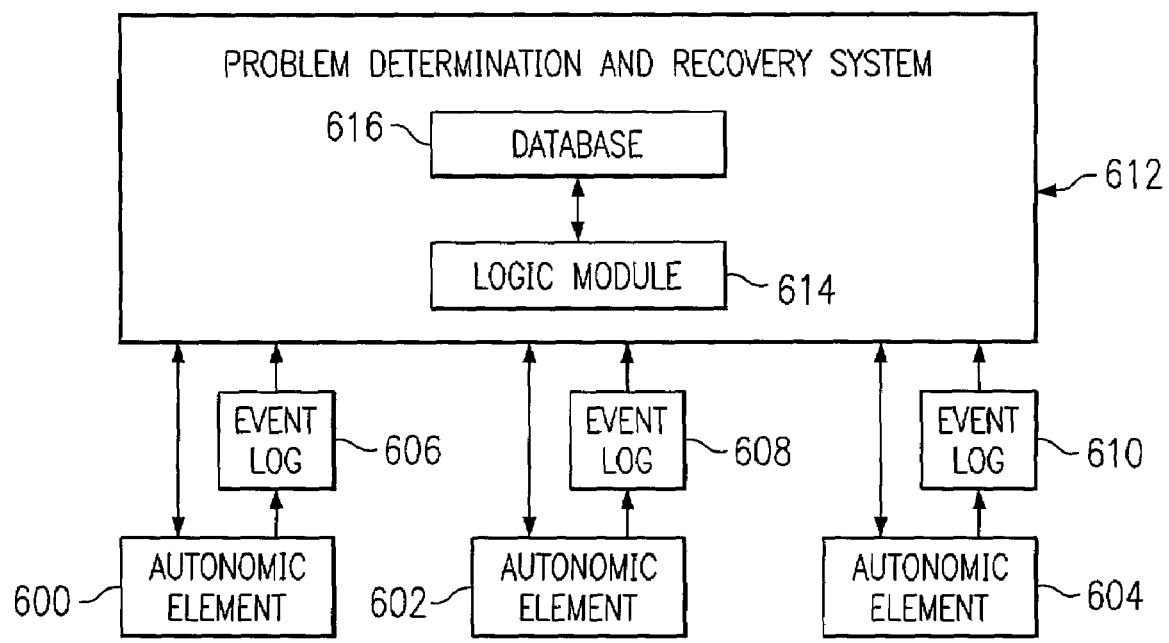
FIG. 6 is an overall view of a problem detection and correction system in accordance with a preferred embodiment of the present invention.

FIG. 6 is a diagram providing an overall view of a system for problem determination and error recovery in an autonomic computing system in accordance with a preferred embodiment of the present invention. An autonomic computing system is comprised of a number of autonomic elements 600, 602, and 604, which are hardware and software components that are self-contained inasmuch as they are self-managed, but which operate in a cooperative manner by utilizing each others' services. Each of autonomic elements 600, 602, and 604 maintains an event log (606, 608, and 610, respectively) and interacts with the Problem Determination and Error Recovery system 612, which may be contained within the individual autonomic elements 600, 602, and 604 or may be contained within another autonomic element or component that specializes in this function.

The Logic Module 614 in the Problem Determination and Error Recovery system 612 directs each of autonomic elements 600, 602, and 604 to log events of specified types, under specified conditions, with a specified level of detail. Based on the event logs received from the autonomic elements, the Logic Module 614 attempts to diagnose the problem (or the threat of a problem). Once a problem (or potential problem) is detected, the Logic Module suggests courses of action to the autonomic elements to recover from the problem. The specifics of the types of available elements, events, problems and actions are stored in the Database 616 associated with the Logic Module 614.

In terms of logging of events, it can thus be said that the Logic Module 614 establishes a policy by which each of autonomic elements 600, 602, and 604 log events. Events may include actions taken by any of autonomic elements 600, 602, and 604, inputs received by autonomic elements 600, 602, and 604, or other events observable by autonomic elements 600, 602, and 604. It is understood that Event logs 606, 608, 610 may also include various system configurations, workload characteristics, and performance measures in 600, 602, 604 respectively. Event logs 606, 608, and 610 may be written in any suitable data format, although in a preferred embodiment a structured, machine-readable format, such as XML, may be used. Alternatively, event logs 606, 608, and 610 may be represented in any database or data storage format, such as a relational database, object-oriented database, object-relational database, deductive database, or any other suitable storage format. Typically, the information stored in event logs 606, 608, and 610 will identify particular occurrences of events, their time of occurrence, and any parameters or other data useful for the interpretation of events. It is understood that Event logs 606, 608, 610 may also include various system configurations, workload characteristics, and performance measures in 600, 602, 604, respectively. One of ordinary skill in the art will recognize that a wide variety of items of information regarding events within the computing system may be stored in event logs 606, 608, and 610 without departing from the scope and spirit of the present invention. Moreover, any number of autonomic elements, comprising hardware components, software components, or both, may be used.

Figure 7:
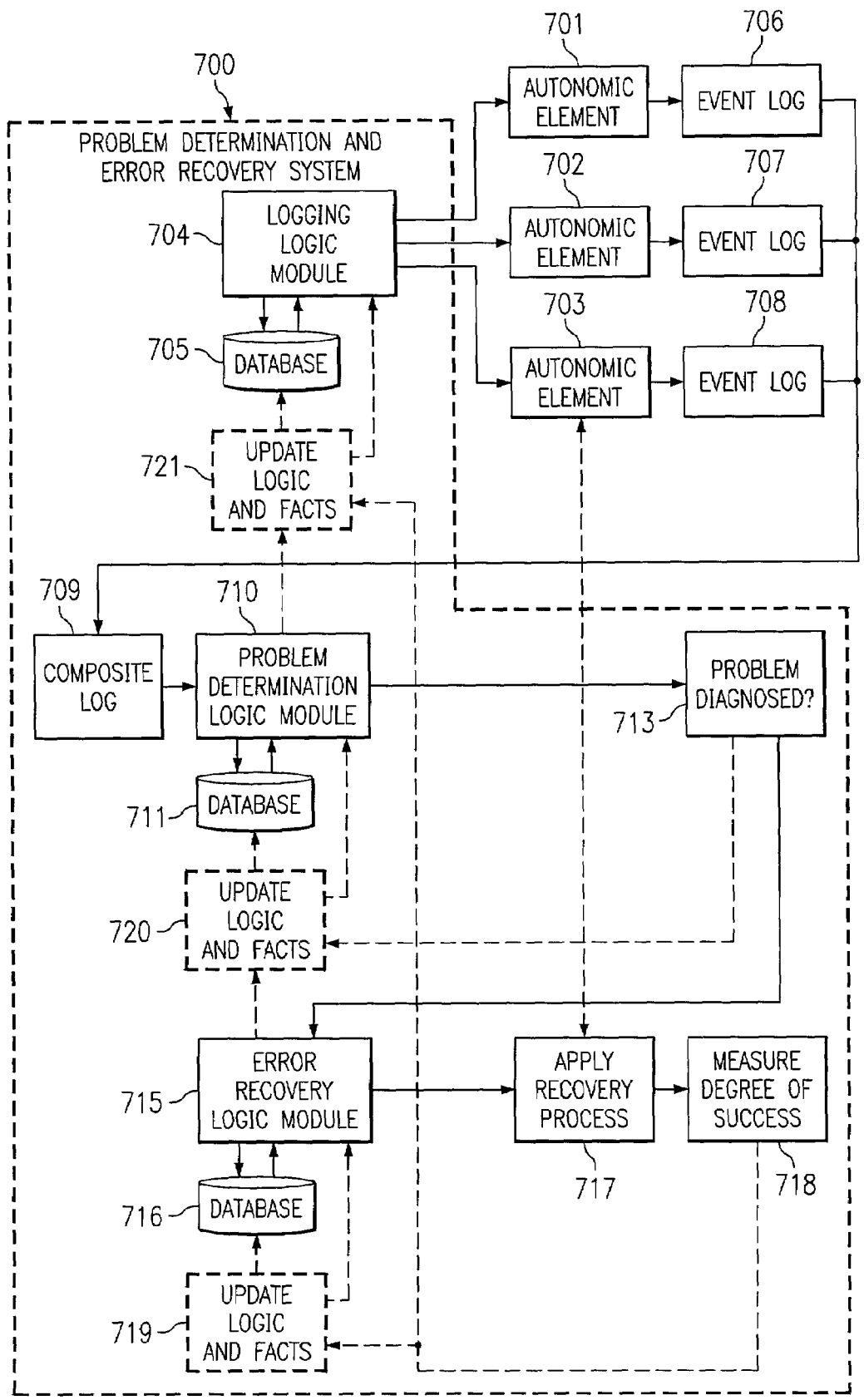
FIG. 7 is a detailed view of a problem detection and correction system in accordance with a preferred embodiment of the present invention.

In a preferred embodiment of the present invention, the Logic Module 614 is divided into three separate logic modules, namely the Logging Logic Module 704, the Problem Determination Logic Module 710 and the Error Recovery Logic Module 715 as shown in FIG. 7. Each of these logic modules includes an inference engine (not shown) that applies sets of rules including those of the form IF<Condition(s)>THEN<Action(s)> or

WHILE<Conditions(s)>DO<Action(s)> to observed data to make their decisions. Thus, each of Logging Logic Module 704, Problem Determination Logic Module 710, and Error Recovery Logic Module 715 may be thought of as a kind of expert system having an inference engine that applies a knowledge base of logical inference rules to make decisions regarding the logging of data, diagnosis of problems, and recovery from errors, respectively. In the rules making up each knowledge base, a condition clause (e.g., the "X" in "if X then Y") may include variables and be as simple as "element X is of type T1", or complex, involving statistical, machine learning, or artificial intelligence techniques. Examples of statistical techniques to define the condition clause may include (but are not limited to) the application of Student's T-test, correlation analysis, or regression analysis. Examples of machine learning and artificial intelligence techniques to define the condition clause may include (but are not limited to) supervised learning methods such as neural networks, Bayesian networks, or Support Vector Machines, and unsupervised learning methods such as k-means clustering, hierarchical clustering, or principal component analysis.

In a similar fashion, the action clause may include variables and be simple as "Log events of type E1 in element X". Actions may also involve the delegation of a complex task to an element such as "Reduce workload in element X by 10%," where the details of how to reduce the workload are determined by the autonomic element X. Moreover, actions may include the creation, modification, or removal of rules from the rule sets in the three Logic Modules. This rule learning process may be performed using any appropriate machine learning technique, including those previously enumerated herein. For example, upon the discovery of a new diagnosis, an action clause may state "Add a new rule R in the Problem Determination Logic Module where R: IF events of type E5 and E6 occur simultaneously in an element of type T1, THEN problem of type P9 has occurred."

The specifics of the types of available (or known) elements, events, known problems, conditions, and actions are all stored in the Databases 705, 711, 716 associated with each of the three logic modules 704, 710, and 715, respectively. These Databases can be updated (e.g., a new class of element is introduced) both by machines as well as humans.

It should be noted from the above description that the preferred embodiment of the present invention allows for at least two levels of adaptivity in the rule sets contained in the three logic modules 704, 710, and 715. First, there is the adaptivity in the condition clauses that are under the control of algorithms with the ability to learn from past experience or examples. For example, over a period of time, a neural network may learn to diagnose a particular problem with increasing accuracy by modifying the weights in its network. Thus the condition clause will gain increasing specificity in diagnosing that problem.

A more important type of adaptivity is possible because the present invention permits the generation, prioritization, modification, and removal of rules from rule sets in the Logic Modules based on the efficacy of the actions suggested by the rules themselves. First, machine learning approaches such as Inductive logic programming may be employed to infer new rules from existing rule sets. Examples of inductive logic programming include the FOIL algorithm described in Quinlan, J. R., Cameron-Jones, R. M., "Induction of Logic Programs: FOIL and Related Sytems," *New Generation Computing* 13 (1995), pp. 287–312, which is hereby incorporated by reference, or the GOLEM algorithm described in Muggleton, S., Feng, C., "Efficient Induction of Logic Programs," in *Proceedings of the 1st Conference on Algorithmic Learning Theory*, Ohmsha, Tokyo, 1990, which is hereby also incorporated by reference. Moreover, the effectiveness of new and old rules in solving or preventing problems are monitored by the Problem Determination and Error Recovery System 700 as well as its human operators, and the results are used to re-prioritize, modify or remove rules in the rule sets. These changes may give rise to further creation of new rules through application of inductive logic programming. Thus, the adaptivity of the rule sets in the Logic Modules will emerge through the automatic application of inference engines in the Logic Modules and through direct human intervention.

FIG. 7 provides a detailed example of how the preferred embodiment of the present invention can be successful in automatically determining a problem and in recovering from the error given event logs from different autonomic elements.

FIG. 7 shows three autonomic elements 701, 702, 703. The Logging Logic Module 704 may consult the configurations and characteristics of the above three autonomic elements stored in its Database 705 of facts and conditions to determine rules (including If-then rules) that govern the information that is logged by each element. For example, Logging Logic Module 704 may include the following three logging logic rules:
  (i) r1: IF Element is of type T1 THEN it should log the number of new occurrences of events of type E1 and E2 in its system every minute.
  (ii) r2: IF Element is of type T2 THEN it should should report its time-averaged workload in percentage CPU utilization and its time-averaged response time in milliseconds every five minutes.
  (iii) r3: IF Element is of type T3 THEN it should report events of type E3 every hour.

Logging Logic Module 704 may consult its Database 705 to determine than Autonomic Elements 701, 702, and 703 are elements of type T1, T2, and T3, respectively. Database 705 also specifies the details of types of events each class of elements is capable of logging. Thus Logging Logic Module 704 need not know the details of how each autonomic element actually implements the logging process, it simply knows that elements of a certain type can log a particular class of events. Upon direction from the Logging Logic Module 704, Elements 701, 702, 703 will record events as prescribed by the pertinent logging logic rules in their respective Event Logs 706, 707, 708. These logs are continuously compiled into a Composite Log 709 and fed continuously to Problem Determination Logic Module 710.

Problem Determination Logic Module 710 may have various rules to detect and classify problems from Composite Log 709. For example, Problem Determination Logic Module 710 may have the following rules R1, R2, R3 and R4:
  R1: IF an element of type T1 fails to report an event of type E2 within any time span of one minute THEN Element of type T1 has a problem of class P1,
  R2: IF an element of type T2 reports a time-averaged response time greater than 600 milliseconds THEN Element of type T2 has a problem of class P2.
  R3: IF an element of type T1 has a problem of class P1 OR P10, AND if an Element of type T2 has a problem of class P2 THEN element of type T3 may have a problem of class P3 with 80% probability in the next five minutes.
  R4: IF a problem of class P3 is suspected with probability more than 50% in the next five minutes THEN communicate the diagnosis to the Error Recovery Logic Module 715.

If Problem Determination Logic Module 710 determines that Composite Log 709 satisfies the conditions of Rule R1 and R2, it will use its knowledge base (Database 711), and its inference engine (not shown) to draw the conclusions that Element 701 has a problem of class P1 and Element 702 has a problem of class P2. These conclusions will constitute new facts that will together satisfy the conditions of rule R3, causing the inference engine to conclude further that element 703 may have a problem of class P3 with 80% probability in the next five minutes. The probabilistic assertion of a problem of class P3 will, in turn, trigger rule R4 that will direct Problem Determination Logic Module 710 to communicate the diagnosis to Error Recovery Logic Module 715. It is also possible that Database 711 of Problem Determination Logic Module 710 may contain a list of problem types that is to be reported to Error Recovery Logic Module 715 for further processing. As another approach, Problem Determination Logic Module 710 may wait until its inference engine reaches no more problem diagnoses before communicating the results to Error Recovery Logic Module 715.

It is to be noted that Database 711 for Problem Determination Logic Module 710 not only contains information about the types of autonomic elements, but it may also store auxiliary data about inter-element dependencies. Problem Determination Logic Module 710 can use the information about the inter-element dependencies to make faster and more accurate problem diagnosis.

Upon receiving information that a problem of class P3 is likely to occur, Error Recovery Logic Module 715 will determine a course of action after consulting its Database 716 and using its inference engine (not shown). The course of action might be designed to prevent, reduce, or correct a problem that has occurred or is anticipated to occur. The appropriate course of action may be expressed as rules contained within Error Recovery Logic Module 715. An example of an If-then rule expressing a condition and a corresponding course of action is:
  R5: IF a problem of class P3 is likely to occur in an element of type T3 with more than 60% probability in the next five minutes THEN take action A1: attempt to reduce the workload that element of type T2 by 10%.

In this case, the increased likelihood of a problem in Element 703 causes Error Recovery Logic Module 715 to take the proactive action A1 in an Element of type T2 with the goal of reducing the chances that problem P3 actually occurs in an Element of type T3.

In addition to taking direct actions to correct, reduce or prevent the occurrences of problems, Error Recovery Logic Module 715 may have other rules that govern the collection of logging information. For example, it might contain an If-then rule such as:
  R6: IF a problem of class P3 is likely to occur in an element of type T3 with more than 60% probability in the next five minutes THEN add a new rule r4 in Logging Logic Module 704, where R4:
    The element of type T2 should report its workload and the element of type T3 should report Events of type E3 every minute until further notice by Error Recovery Logic Module 715.

In this case, the increased likelihood of a problem in Autonomic Element 703 ultimately causes a change in the Logging Logic Module such that there is an increase in the rate at which Elements 702 and 703 are monitored.

Once the above actions are taken, the degree of their success (or failure) in preventing a problem is monitored in Measurement Module 718. This module stores information about past actions suggested by the Error Recovery Logic Module and the subsequent behavior of the autonomic elements. This is especially important in situations where there is a considerable time delay in the autonomic elements between its actions and the resulting events. For example, Measurement Module 718 may determine that in the last seven days the problem of class P3 has occurred in three of the nine situations when rule R5 was activated and action A1 was taken. The degree of success determines how the rules in Error Recovery Logic Module 715, Problem Determination Logic Module 710, and Logging Logic Module 721 as well as the facts in the corresponding Databases (716, 711, and 705) are modified and updated. For example, a rule R7 in Update Logic 719 may state:

R7: IF an element of type T3 experiences a problem of class P3 even after action A1 was taken within the previous five minutes, THEN modify action A1 such that A1 attempts to reduce the workload in element of type T2 by an additional 10% unless the measured workload is less than 10%.

Note that the rules in Error Recovery Logic Module 719, Problem Determination Logic Module 720, and Logging Logic Module 721 as well as the facts in the corresponding Databases (705, 711, and 716) can be modified not only by machines but by humans as well. Thus prior or new domain knowledge can be incorporated into the system at any time by external entities to help in faster problem detection and error recovery.

Any problem determination and correction system in an autonomic computing system must deal with the fact that in an autonomic computing system, autonomic elements are constantly being added, removed, and modified to meet changing functional requirements. Thus the inference and action engines in the Logic Modules must be adaptive and respond with appropriate changes in its rule set in diagnosing faults (or threats of faults), and in treating faults (or threats of faults). To support this adaptivity, the preferred embodiment of the present invention satisfies four objectives described in Rouvellou, I.; DeGenaro, L.; Chan, H.; Rasmus, K.; Grosof, B. N.; Ehnebuske, D.; McGee, B., "Combining Different Business Rules Technologies: A Rationalization," In *Proc. of the OOPSLA* 2000 *Workshop on Best-practices in Business Rule Design and Implementation,* held Minneapolis, Minn., USA, Oct. 15, 2000:

(i) Isolation of procedural logic in the Logic Modules from the atomic details of the underlying autonomic elements. For example, reconsider the modified action A1 due to rule R7:

A1: Attempt to reduce the workload in element of type T2 by an additional 10% unless the measured workload is less than 10%. In this case, the Update Logic Module 719 or the Error Recovery Logic Module 715 may have no information on how an element of type T2 actually reduces the measured workload by 10%. But, relying on Database 716, Error Recovery Logic Module 715 knows that an element of type T2 has some procedure or method to reduce its measured workload by 10%. Moreover, action A1 can be applied to all instances of autonomic elements belonging to type T2.

Note the this separation of procedural logic from the underlying autonomic elements will allow for externalization of the Logic Modules where a third party may offer services for problem determination and error recovery.

(ii) Adoption of a unified framework that adds, modifies, and removes platform and environment dependent data in the Databases without affecting the inference and action engine in the Logic Modules. As an example, when autonomic element 701 is first added to the system, a new entry in the Database 705 is made to indicate that it is of type T1. Environment dependent data could reassign one type of element, event or problem into another without influencing the logic in the Logging Modules. For example, due to the unavailability of certain components in a particular autonomic element 703 of type T3, Databases 705, 711, and 716 may temporarily classify element 703 to be of type T1.

Note that this separation of platform and environment dependent data relating to the autonomic elements from the inference and action engine in the Logic Modules will allow for externalization of the Logic Modules as well as the Databases where a third party may offer services for problem determination and error recovery.

(iii) Creation, re-prioritization, modification, and removal of rules from the rule sets in the Logic Modules either through automatic application of inference engines or through human intervention. For example, reconsider rule R6:

R6: IF a problem of class P3 is likely to occur in an element of type T3 with more than 60% probability in the next five minutes THEN add a new rule r4 in Logging Logic Module 704, where
r4: The element of type T2 should report its workload and the element of type T3 should report Events of type E3 every minute until further notice by Error Recovery Logic Module 715.

In this case, a new rule r4 is created by Error Recovery Logic Module 715 and added to the rule set of Logging Logic Module 704.

(iv) Resolution of conflicts among multiple rules whenever conflicts occur following the creation, modification, or removal of rules in the rule sets of the Logic Modules. For example, reconsider the introduction of the above rule r4 in Logging Logic Module 704:

r4: The element of type T2 should report its workload and the element of type T3 should report Events of type E3 every minute until further notice by the Error Recovery Logic Module 715.

However, in this example, the Logging Logic Module already has a rule r3:

r3: IF Element is of type T3 THEN it should report events of type E3 every hour.

Thus the rules r3 and r4 are in conflict with each other as they ask for different actions to be taken by the autonomic element 703 (which is of type T3) in response to events of type E3.

Before conflicts can be resolved, the inference and action engine must be able to identify the occurrences of conflicts. Typically, conflicts are likely to occur whenever rules are created, modified, re-prioritized, or removed from the rule set in the Logic Modules. Thus when changes occur in the rule set, the inference engine may automatically investigate for possible incidences of conflicts.

Once a conflict is identified, the inference and action engine may use a variety of conflict resolution mechanisms including those based on (but not limited to) absolute predetermined priority (or ranking), specificity, or time of origin. One of ordinary skill in the art will recognize that any one of a number of possible heuristic functions or stochastic metrics may be employed to estimate the relevance of a given rule or relationship and that the possibilities enumerated here are not intended to be an exhaustive list. Courteous Logic Programming is one technique that may be employed to handle prioritization and conflict resolution among rules. Courteous Logic Programming is described in Grosof, B., "IBM Research Report: Courteous Logic Programs: Prioritized Conflict Handling for Rules," May 8, 1997, which is incorporated herein by reference.

As an example of conflict resolution, consider rules r3 and r4 above. In the conflict between rules r3 and r4, the Logging Logic may contain a fixed prioritization rule that assigns rule r4 a higher priority than rule r3. In other cases, the relative priority of rules may be determined in a more dynamic and indirect manner via prioritization rules that depend on some aspect of the rule, such as its specificity (e.g. a rule about elements of type T2 receives higher priority than a general rule about all elements), how recently it was introduced into the rule set (e.g. more recent rule takes precedence over an older one), how recently it was activated (e.g. if rule r3 is satisfied more than 10 seconds before rule r4, then rule r4 takes priority), or how frequently it has been activated over a given time period (e.g. a rule whose condition has been satisfied 10 times an hour might take priority over one whose condition has been satisfied just once per day). Another rule prioritization criterion is the perceived efficacy of a rule. For example, suppose that in the last seven hours the Problem Determination Logic Module 710 has diagnosed the likely occurrence of a problem of class P3 on ten occasions. Although in each instance the Error Recovery Logic Module 715 has responded by activating rule R5 and taking action A1, it has failed to prevent the occurrence of problems of class P3 in eight out of the ten cases. In light of this historical information, a prioritization rule may decree that all rules for which the action contains A1 should be reduced in priority. Rules that repeatedly fail may decrease in priority to the point where they are finally removed automatically from the rule set. Allowing for dynamic changes in rule priority is important in autonomic systems because autonomic elements are continually being added, modified, and removed, and any inference rules or other relationships, particularly those derived through machine learning or data mining, are likely to vary in relevance.

Although FIG. 7's representation of the preferred embodiment of the present invention is sequential in nature, one of ordinary skill in the art will appreciate that the blocks denoting actions that are presented in FIG. 7 need not be executed in the order shown or even sequentially. Embodiments in which multiple tasks are executed in parallel or concurrently (e.g., as separate threads or processes) are possible to be achieved without departing from the scope and spirit of the present invention.

One of ordinary skill in the art will recognize that in the preferred embodiment, a single problem detection and correction logic is used to perform four tasks in problem determination and error recovery: 1.) Employing an inference and action engine that direct system components to log events of specified types, under specified conditions, with a specified level of detail, 2.) Employing an inference and action engine to diagnose problems (or threats of problems) by correlating the event logs with signatures of problems with the help learning/data mining algorithm(s), 3.) Employing an inference and action engine that determines course(s) of action based on the problem diagnosis, and the measurement the success or failure of those actions in solving the problem, 4.) Employing a method that allows the different inference and action engines to be adaptive by incorporating four features (a) isolating the procedural logic of the different inference and action engines from the details of system components, (b) adopting a framework to add, modify, and remove platform and environment dependent data without affecting the inference and action engine (c) creating, modifying, prioritizing, or removing rules (d) resolving conflicts among multiple rules. One of ordinary skill in the art will also recognize that separate autonomic elements or other components may perform these tasks individually. For example, a first autonomic element may set the logging policy, while another autonomic element applies a learning algorithm to derive new knowledge regarding problems and their solutions. An autonomic computing system may then combine these individual problem detection/correction elements in a "mix-and-match" manner to meet current requirements.

It is important to note that while the present invention has been described in the context of a fully functioning data processing system, those of ordinary skill in the art will appreciate that the processes of the present invention are capable of being distributed in the form of a computer readable medium of instructions or other functional descriptive material and in a variety of other forms and that the present invention is equally applicable regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system. Functional descriptive material is information that imparts functionality to a machine. Functional descriptive material includes, but is not limited to, computer programs, instructions, rules, facts, and definitions of computable functions, objects, and data structures.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer-based method for providing problem determination and error recovery features to a computing environment, the method comprising:

receiving information regarding a status of the computing environment;

identifying at least three applicable rules from a knowledge base of rules, wherein the at least three applicable rules are applicable to the status of the computing environment; and applying the at least three applicable rules to obtain a result, wherein the at least three applicable rules from the knowledge base of rules includes a logging logic rule used by a logging logic module and associated inference engine in specifying that particular events should be logged by system components under particular circumstances, a problem determination logic rule used by a problem determination logic module and associated inference engine in specifying that a presence of particular information contained within event logs indicates a particular problem, and an error recovery logic rule used by an error recovery logic module and associated inference engine in specifying that a particular problem implies a particular solution to the particular problem should be followed.

2. The method of claim 1, wherein a result of the logging rule is a logging policy specifying how particular events should be logged by the system components to generate the event logs.

3. The method of claim 2, wherein the logging policy includes an identification of the system components to perform logging of the particular events.

4. The method of claim 2, wherein the logging policy includes specified conditions under which the particular events are to be logged.

5. The method of claim 2, wherein the logging policy includes a specified level of detail at which the particular events are to be logged.

6. The method of claim 2, wherein a result of the problem determination logic rule is a problem diagnosis of a future problem likely to occur and is used by the error recovery logic rule to reduce chances that the future problem will actually occur.

7. The method of claim 6, wherein the at least one problem determination logic rule correlates particular information contained within event logs to problems using a statistical test.

8. The method of claim 6, wherein the at least one problem determination logic rule correlates particular information contained within event logs to problems using a machine learning algorithm.

9. The method of claim 6, wherein one potential result of the error recovery logic rule is a course of action to follow in resolving a problem and another potential result of the error recovery logic rule is adapting the logging logic module to specify different particular events that should be logged by the system components.

10. A computer-based method for providing problem determination and error recovery features to a computing environment, the method comprising:
receiving information regarding a status of the computing environment;
identifying at least three applicable rules from a knowledge base of rules, wherein the at least three applicable rules are applicable to the status of the computing environment;
applying the at least three applicable rules to obtain a result, wherein the at least three applicable rules, utilized by corresponding inference engines includes a logging logic rule specifying that particular events should be logged by system components under particular circumstances, a problem determination logic rule specifying that a presence of particular information contained within event logs indicates a particular problem, and an error recovery logic rule specifying that a particular problem implies a particular solution to the particular problem should be followed, wherein result of the error recovery logic rule is a course of action to follow in resolving a problem;
following the course of action to resolve the problem; and
in response to following the course of action, determining a degree of success of the course of action.

11. The method of claim 10, further comprising:
prioritizing the rules in the knowledge base in response to the degree of success of the course of action.

12. The method of claim 1, further comprising:
applying a machine learning algorithm to add additional rules to the knowledge base.

13. The method of claim 12, wherein the machine learning algorithm is an inductive logic programming algorithm.

14. The method of claim 1, further comprising:
determining a degree of relevance of a rule in the knowledge base; and
in response to a determination that the rule has a low degree of relevance, removing the rule.

15. The method of claim 1, further comprising:
determining a degree of relevance of a rule in the knowledge base; and
in response to a determination that the rule has a low degree of relevance, assigning the rule a low priority in the knowledge base.

16. The method of claim 1, further comprising:
applying a machine learning algorithm to modify rules within the knowledge base.

17. The method of claim 16, wherein the machine learning algorithm is a supervised learning algorithm.

18. The method of claim 17, wherein the supervised learning algorithm is one of a neural network, a Bayesian network, and Support Vector Machines.

19. The method of claim 16, wherein the machine learning algorithm is an unsupervised learning algorithm.

20. The method of claim 19, wherein the unsupervised learning algorithm is one of k-means clustering, hierarchical clustering, and principal component analysis.

21. The method of claim 1, wherein receiving the information regarding the status of to computing environment, identifying the at least one applicable rule, and applying the at least one applicable rule are performed in response to a request from a client.

22. A computer program product in a computer-readable medium comprising functional descriptive material that, when executed by a computer, enables the computer to perform acts including:
receiving information regarding a status of the computing environment;
identifying at least three applicable rules from a knowledge base of rules, wherein the at least three applicable rules are applicable to the status of the computing environment; and
applying the at least three applicable rules to obtain a result,
wherein the at least three applicable rules from the knowledge base of rules includes a logging logic rule used by a logging logic module and associated inference engine in specifying that particular events should be logged by system components under particular circumstances, a problem determination logic rule used by a problem determination logic module and associated inference engine in specifying that a presence of particular information contained within event logs indicates a particular problem, and an error recovery logic rule used by an error recovery logic module and associated inference engine in specifying that a particular problem implies a particular solution to the particular problem should be followed.

23. The computer program product of claim 22, wherein a result of the logging logic rule is a logging policy specifying how particular events should be logged by the system components to generate the event logs.

24. The computer program product of claim 23, wherein the logging policy includes an identification of the system components to perform logging of the particular events.

25. The computer program product of claim 23, wherein the logging policy includes specified conditions under which the particular events are to be logged.

26. The computer program product of claim 23, wherein the logging policy includes a specified level of detail at which the particular events are to be logged.

27. The computer program product of claim 23, wherein a result of the problem determination logic rule is a problem diagnosis of a future problem likely to occur and is used by the error recovery logic rule to reduce chances that the future problem will actually occur.

28. The computer program product of claim 27, wherein the at least one problem determination logic rule correlates particular information contained within event logs to problems using a statistical test.

29. The computer program product of claim 27, wherein the at least one problem determination logic rule correlates particular information contained within event logs to problems using a machine learning algorithm.

30. The computer program product of claim 27, wherein one potential result of the error recovery logic rule is a course of action to follow in resolving a problem and another potential result of the error recovery logic rule is adapting the logging logic module to specify different particular events that should be logged by the system components.

31. A computer program product in a computer-readable medium comprising functional descriptive material that, when executed by a computer, enables the computer to perform acts including:
  receiving information regarding a status of the computing environment;
  identifying at least three applicable rules from a knowledge base of rules, wherein the at least three applicable rules are applicable to the status of the computing environment;
  applying the at least three applicable rules to obtain a result, wherein the at least three applicable rules from the knowledge base of rules, utilized by corresponding inference engines includes a logging logic rule specifying that particular events should be logged by system components under particular circumstances, a problem determination logic rule specifying that a presence of particular information contained within event logs indicates a particular problem, and an error recovery logic rule specifying that a particular problem implies a particular solution to the particular problem should be followed, wherein a result of the error recovery logic rule is a course of action to follow in resolving a problem;
  following the course of action to resolve the problem; and
  in response to following the course of action, determining a degree of success of the course of action.

32. The computer program product of claim 31, comprising additional functional descriptive material that, when executed by the computer, enables the computer to perform additional acts including:
  prioritizing the rules in the knowledge base in response to the degree of success of the course of action.

33. The computer program product of claim 22, comprising additional functional descriptive material that, when executed by the computer, enables the computer to perform additional acts including:
  applying a machine learning algorithm to add additional rules to the knowledge base.

34. The computer program product of claim 33, wherein the machine learning algorithm is an inductive logic programming algorithm.

35. The computer program product of claim 22, comprising additional functional descriptive material that, when executed by the computer, enables the computer to perform additional acts including:
  determining a degree of relevance of a rule in the knowledge base; and
  in response to a determination that the rule has a low degree of relevance, removing the rule.

36. The computer program product of claim 22, comprising additional functional descriptive material that, when executed by the computer, enables the computer to perform additional acts including:
  determining a degree of relevance of a rule in the knowledge base; and
  in response to a determination that the rule has a low degree of relevance, assigning the rule a low priority in the knowledge base.

37. The computer program product of claim 22, comprising additional functional descriptive material that, when executed by the computer; enables the computer to perform additional acts including:
  applying a machine learning algorithm to modify rules within the knowledge base.

38. The computer program product of claim 37, wherein the machine learning algorithm is a supervised learning algorithm.

39. The computer program product of claim 38, wherein the supervised learning algorithm is one of a neural network, a Bayesian network, and Support Vector Machines.

40. The computer program product of claim 37, wherein the machine learning algorithm is an unsupervised learning algorithm.

41. The computer program product of claim 40, wherein the unsupervised learning algorithm is one of k-means clustering, hierarchical clustering, and principal component analysis.

42. The computer program product of claim 22, wherein receiving the information regarding the status of the computing environment, identifying the at least one applicable rule, and applying the at least one applicable rule are performed in response to a request from a client.

43. A data processing machine comprising:
  means for receiving information regarding a status of the computing environment;
  means for identifying at least three applicable rules from a knowledge base of rules, wherein the at least three applicable rules are applicable to the status of the computing environment; and
  means for applying the at least three applicable rules to obtain a result,
  wherein the at least three applicable rules from the knowledge base of rules includes a logging logic rule used by a logging logic module and associated inference engine in specifying that particular events should be logged by system components under particular circumstances, a problem determination logic rule used a problem determination logic module and associated inference engine in specifying that a presence of particular information contained within event logs indicates a particular problem, and an error recovery logic rule used by an error recovery logic module and associated inference engine in specifying that a particular problem implies a particular solution to the particular problem should be followed.

44. The data processing machine of claim 43, wherein a result of the logging logic rule is a logging policy specifying how particular events should be logged by the system components to generate the event logs.

45. The data processing machine of claim 44, wherein the logging policy includes an identification of the system components to perform logging of the particular events.

46. The data processing machine of claim 44, wherein the logging policy includes specified conditions under which the particular events are to be logged.

47. The data processing machine of claim 44, wherein the logging policy includes a specified level of detail at which the particular events are to be logged.

48. The data processing machine of claim 44, wherein a result of the problem determination logic rule is a problem diagnosis of a future problem likely to occur and is used by the error recovery logic rule to reduce chances that the future problem will actually occur.

49. The data processing machine of claim 48, wherein the at least one problem determination logic rule correlates particular information contained within event logs to problems using a statistical test.

50. The data processing machine of claim 48, wherein the at least one problem determination logic rule correlates particular information contained within event logs to problems using a machine learning algorithm.

51. The data processing machine of claim 48, wherein one potential result of the error recovery logic rule is a course of action to follow in resolving a problem and another potential result of the error recovery logic rule is adapting the logging logic module to specify different particular events that should be logged by the system components.

52. A data processing machine comprising:
means for receiving information regarding a status of the computing environment;
means for identifying at least three applicable rules from a knowledge base of rules, wherein the at least three applicable rules are applicable to the status of the computing environment;
means for applying the at least three applicable rules to obtain a result, wherein the at least three applicable rules from the knowledge base of rules, utilized by corresponding inference engines includes a logging logic rule specifying that particular events should be logged by system components under particular circumstances, a problem determination logic rule specifying that a presence of particular information contained within event logs indicates a particular problem, and an error recovery logic rule specifying that a particular problem implies a particular solution to the particular problem should be followed, wherein a result of the error recovery logic rule is a course of action to follow in resolving a problem;
means for following the course of action to resolve the problem; and
means, responsive to following the course of action, for determining a degree of success of the course of action.

53. The data processing machine of claim 52, further comprising:
means for prioritizing the rules in the knowledge base in response to the degree of success of the course of action.

54. The data processing machine of claim 43, further comprising:
means for applying a machine learning algorithm to add additional rules to the knowledge base.

55. The data processing machine of claim 54, wherein the machine learning algorithm is an inductive logic programming algorithm.

56. The data processing machine of claim 43, further comprising:
means for determining a degree of relevance of a rule in the knowledge base; and
means, responsive to a determination that the rule has a low degree of relevance, for removing the rule.

57. The data processing machine of claim 43, further comprising:
means for determining a degree of relevance of a rule in the knowledge base; and
means, responsive to a determination that the rule has a low degree of relevance, for assigning the rule a low priority in the knowledge base.

58. The data processing machine of claim 43, further comprising:
means for applying a machine learning algorithm to modify rules within the knowledge base.

59. The data processing machine of claim 58, wherein the machine learning algorithm is a supervised learning algorithm.

60. The data processing machine of claim 59, wherein the supervised learning algorithm is one of a neural network, a Bayesian network, and Support Vector Machines.

61. The data processing machine of claim 58, wherein the machine learning algorithm is an unsupervised learning algorithm.

62. The data processing machine of claim 61, wherein the unsupervised learning algorithm is one of k-means clustering, hierarchical clustering, and principal component analysis.

63. The data processing machine of claim 43, wherein receiving the information regarding the status of the computing environment, identifying the at least one applicable rule, and applying the at least one applicable rule are performed in response to a request from a client.

* * * * *